(12) United States Patent
Sakamoto et al.

(10) Patent No.: US 7,553,561 B2
(45) Date of Patent: Jun. 30, 2009

(54) RARE EARTH MAGNET

(75) Inventors: Takeshi Sakamoto, Tokyo (JP); Nobuya Uchida, Tokyo (JP); Yoshitomo Tanaka, Tokyo (JP); Yasuyuki Nakayama, Tokyo (JP)

(73) Assignee: TDK Corporation, Tokyo (JP)

( * ) Notice: Subject to any disclaimer, the term of this patent is extended or adjusted under 35 U.S.C. 154(b) by 350 days.

(21) Appl. No.: 10/566,213

(22) PCT Filed: Jul. 19, 2005

(86) PCT No.: PCT/JP2005/013240

§ 371 (c)(1),
(2), (4) Date: Jan. 27, 2006

(87) PCT Pub. No.: WO2006/009137

PCT Pub. Date: Jan. 26, 2006

(65) Prior Publication Data

US 2008/0053573 A1  Mar. 6, 2008

(30) Foreign Application Priority Data

Jul. 16, 2004  (JP) .............................. 2004-210451

(51) Int. Cl.
*B32B 19/00* (2006.01)
(52) U.S. Cl. .................... 428/692.1; 428/800; 428/680; 428/679
(58) Field of Classification Search ................. 428/800, 428/680, 679
See application file for complete search history.

(56) References Cited

U.S. PATENT DOCUMENTS

| 4,246,316 | A | * | 1/1981 | Aonuma et al. ............. 428/329 |
| 4,869,971 | A | * | 9/1989 | Nee et al. .................... 428/635 |
| 5,302,464 | A | * | 4/1994 | Nomura et al. ............. 428/551 |
| 5,314,756 | A | * | 5/1994 | Tagaya ........................ 428/546 |
| 5,514,477 | A | * | 5/1996 | Ohashi et al. ............... 428/457 |
| 6,118,628 | A | * | 9/2000 | Sano et al. ................ 360/125.5 |
| 6,716,516 | B2 | * | 4/2004 | Futamoto et al. ............ 428/213 |

FOREIGN PATENT DOCUMENTS

| JP | A 59-100286 | 6/1984 |
| JP | A 05-175030 | 7/1993 |
| JP | A 07-106109 | 4/1995 |
| JP | B2 2599753 | 1/1997 |
| JP | A 2001-210504 | 8/2001 |
| JP | A 2002-212783 | 7/2002 |

* cited by examiner

*Primary Examiner*—D. Lawrence Tarazano
*Assistant Examiner*—Gary D Harris
(74) *Attorney, Agent, or Firm*—Oliff & Berridge, Plc.

(57) ABSTRACT

A rare earth magnet having excellent corrosion resistance is provided. It has a magnet body (10) containing a rare earth element, and a protective film (20) formed on the magnet body (10). In the protective film (20), a first protective film (21), a second protective film (22) and a third protective film (23) are laminated in this order from the side of the magnet body (10). These are in a polycrystalline state and composed of a metal plated film, for example. The first protective film (21) and the third protective film (23) have a smaller mean crystal grain size than that of the second protective film (22). Microcrystallization of the first protective film (21) can improve the density of the interface between the protective film (20) and the magnet body (10), and decrease the number of pinholes.

3 Claims, 4 Drawing Sheets

RARE EARTH MAGNET

TECHNICAL FIELD

The present invention relates to a rare earth magnet that has a magnet body containing a rare earth element, and a protective film disposed on the magnet body.

BACKGROUND ART

As a rare earth magnet, for example, Sm—$Co_5$ type, $Sm_2$—$Co_{17}$ type, Sm—Fe—N type, or R—Fe—B type (R indicates a rare earth element) is known, each of which is used as a high-performance permanent magnet. Among these, R—Fe—B type rare earth magnet is especially arousing interest because it employs mainly, as a rare earth element, neodymium (Nd) that occurs in great abundance and is relatively less expensive compared to samarium (Sm), and iron (Fe) is less expensive as well, and additionally because it has magnetic performance equivalent to or higher than Sm—Co type one.

However, the R—Fe—B type rare earth magnet contains, as the chief ingredient, a rare earth element and iron that are susceptible to oxidation and hence the corrosion resistance is relatively low, so that performance degradation and variations remain problems.

With the purpose of improving such a low corrosion resistance of the rare earth magnet, there has been proposed to form on the surface a protective film composed of an oxidation resistant metal or the like. For example, Patent document 1 describes the protective film in which two plated layers of nickel (Ni) are laminated, and Patent document 2 describes one in which a plated layer of nickel-sulfur (S) alloy is laminated on a plated layer of nickel.

Patent document 1: Japanese Patent No. 2599753

Patent document 2: Japanese Laid-Open Patent Publication No. H07-106109

DISCLOSURE OF THE INVENTION

However, although these protective films undoubtedly improve the corrosive resistance of a rare earth magnet, a further improvement has been required because the presence of a slight pinhole may cause corrosion under severe atmospheric environment such as chloride or sulfurous acid gas.

The present invention contemplates the solution of the above problem and it is desirable to provide a rare earth magnet having excellent corrosion resistance.

A rare earth magnet according to the present invention has a magnet body containing a rare earth element, and a protective film disposed on the magnet body. The protective film has a first protective film that is in a polycrystalline state, a second protective film that is in a polycrystalline state and has a larger mean crystal grain size than that of the first protective film, and a third protective film that is in a polycrystalline state and has a smaller mean crystal grain size than that of the second protective film in this order from the side of the magnet body.

The mean crystal grain size of the first protective film is preferably 0.5 µm or less, and the second protective film is preferably in a columnar crystal state. The above-mentioned "mean crystal grain size" of the second protective film is a mean grain size in the major axis direction when the second protective film is in a columnar crystal state. The first protective film, the second protective film, and the third protective film are preferably made up of nickel or nickel alloy, respectively. Each of the mean crystal grain sizes of the first protective film and the third protective film is preferably smaller than that of the second protective film.

In the rare earth magnet according to the present invention, it is arranged that the first protective film of a small mean crystal grain size is disposed between the magnet body and the second protective film. This can improve the density of the protective films and suppress the generation of pinholes, thereby enabling corrosion resistance to be improved.

BEST MODE FOR CARRYING OUT THE INVENTION

Preferred embodiments of the present invention will be described below in detail.

Figure 1:
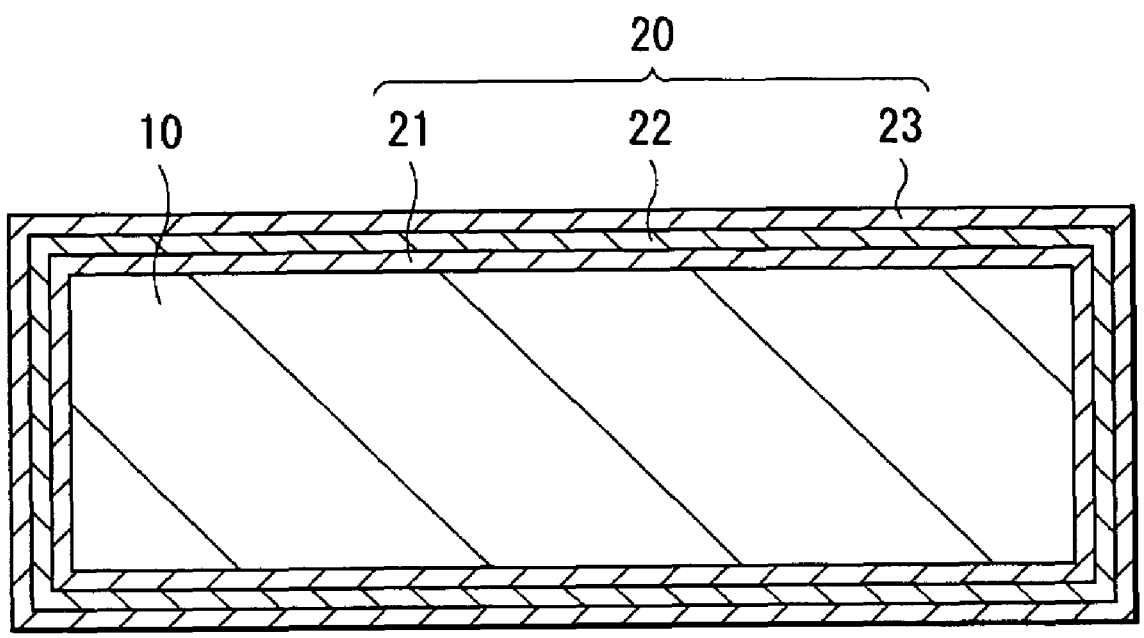
FIG. 1 is a sectional view showing the structure of a rare earth magnet according to an embodiment of the present invention.

FIG. 1 shows the structure of a rare earth magnet according to an embodiment of the present invention. This rare earth magnet has a magnet body 10 containing a rare earth element, and a protective film 20 disposed on the magnet body 10.

The magnet body 10 is made up of a permanent magnet containing a transition metal element and a rare earth element. The term "rare earth element" is the general term referring to 16 elements of yttrium (Y), lantern of lanthanoid, cerium (Ce), praseodymium (Pr), neodymium, promethium (Pm), samarium, europium (Eu), gadolinium (Gd), terbium (Tb), dysprosium (Dy), holmium (Ho), erbium (Er), thulium (Tm), ytterbium (Yb), and lutetium (Lu), each of which belongs to the group III in long-period type periodic table.

As the permanent magnet constituting the magnet body 10, there is, for example, the permanent magnet containing one or more types of rare earth elements, iron, and boron. The magnet body 10 has a main phase of a crystal structure that is substantially a tetragonal system, a rare earth rich phase, and a boron rich phase. The grain size of the main phase is preferably 100 µm or less. The rare earth rich phase and the boron rich phase are non-magnetic phases and exist mainly in the grain boundary of the main phase. The non-magnetic phase content is normally 0.5 vol % to 50 vol %.

As a rare earth element, it is preferable to contain at least one of neodymium, dysprosium, praseodymium, and terbium.

The rare earth element content is preferably 8 atomic % to 40 atomic %. This is because below 8 atomic %, the crystal structure may become the same cubic system structure as α-iron, thus failing to obtain high coercive force (iHc), while above 40 atomic %, the amount of a rare earth rich non-magnetic phase may be increased to thereby reduce residual magnetic flux density (Br).

The iron content is preferably 42 atomic % to 90 atomic %. This is because when iron is below 42 atomic %, residual magnetic flux density may be lowered, while above 90 atomic %, coercive force may be lowered.

The boron content is preferably 2 atomic % to 28 atomic %. This is because when boron is below 2 atomic %, it may turn into rhombohedra structure and hence coercive force becomes insufficient, while above 28 atomic %, the amount of a boron rich non-magnetic phase may be increased thereby to reduce residual magnetic flux density.

In an alternative, part of iron may be substituted by cobalt. This is because temperature characteristic can be improved without affecting magnetic characteristic. In this case, the amount of substitution of cobalt is preferably in such a range that x is 0.5 or less in atomic ratio in terms of $Fe_{1-x}Co_x$. This is because the amount of substitution exceeding this range may degrade magnetic characteristic.

In another alternative, part of boron may be substituted by at least one of carbon (C), phosphorous (P), sulfur, and copper. This is because productivity improvement and cost reduction are attainable. In this case, the contents of carbon, phosphorous, sulfur and copper are preferably 4 atomic % or less of the total. This is because above this value, magnetic characteristic may be degraded.

Moreover, for the purposes of coercive force improvement, productivity improvement, and cost reduction, there may be added one or more kinds of aluminum (Al), titanium (Ti), vanadium (V), chromium (Cr), manganese (Mn), bismuth (Bi), niobium (Nb), tantalum (Ta), molybdenum (Mo), tungsten (W), antimony (Sb), germanium (Ge), tin (Sn), zirconium (Zr), nickel, silicon (Si), gallium (Ga), copper, and hafnium (Hf). In this case, the total amount of addition is preferably 10 atomic % or less of the total. This is because above this value, magnetic characteristic may be degraded.

Furthermore, as unavoidable impurities, oxygen (O), nitrogen (N), carbon (C), calcium (Ca), or the like may be contained in the range of 3 atomic % or less of the total.

As the permanent magnet constituting the magnet body 10, there is also, for example, the permanent magnet containing one or more types of rare earth elements and cobalt, or the permanent magnet containing one or more types of rare earth elements, iron, and nitrogen. Specifically, the permanent magnets containing samarium and cobalt such as $Sm$—$Co_5$ type, $Sm_2$-$Co_{17}$ type (the figure indicates an atomic ratio), or ones containing neodymium, iron and boron such as Nd—Fe—B type are cited.

The protective film 20 has a first protective film 21, a second protective film 22, and a third protective film 23, which are disposed in this order from the side of the magnet body 10. Each of the first, second, and third protective films 21, 22, and 23 is in a polycrystalline state, and is made up of a metal plated film, for example. The term "metal" means not only a simple substance but also alloy.

Each of the mean crystal grain sizes of the first protective film 21 and the third protective film 23 is smaller than that of the second protective film 22. Microcrystallization of the first protective film 21 can improve the density of the interface between the protective film 20 and the magnet body 10, thereby decreasing the number of pinholes. Microcrystallization of the third protective film 23 can densify the surface of the protective film 20, permitting a further decrease in the number of pinholes. The mean crystal grain size of the first protective film 21 is preferably 0.5 µm or less, and the mean crystal grain size of the third protective film 23 is also preferably 0.5 µm or less.

Figure 2:
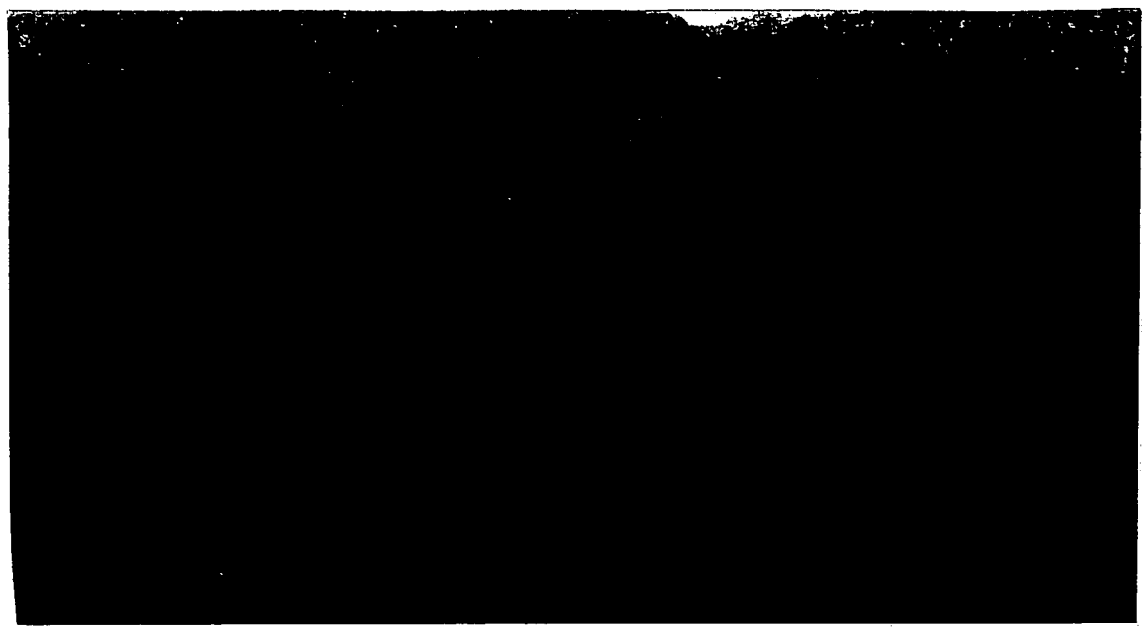
FIG. 2 is an SIM photograph showing a cross-sectional structure of the rare earth magnet shown in FIG. 1.
Figure 3:
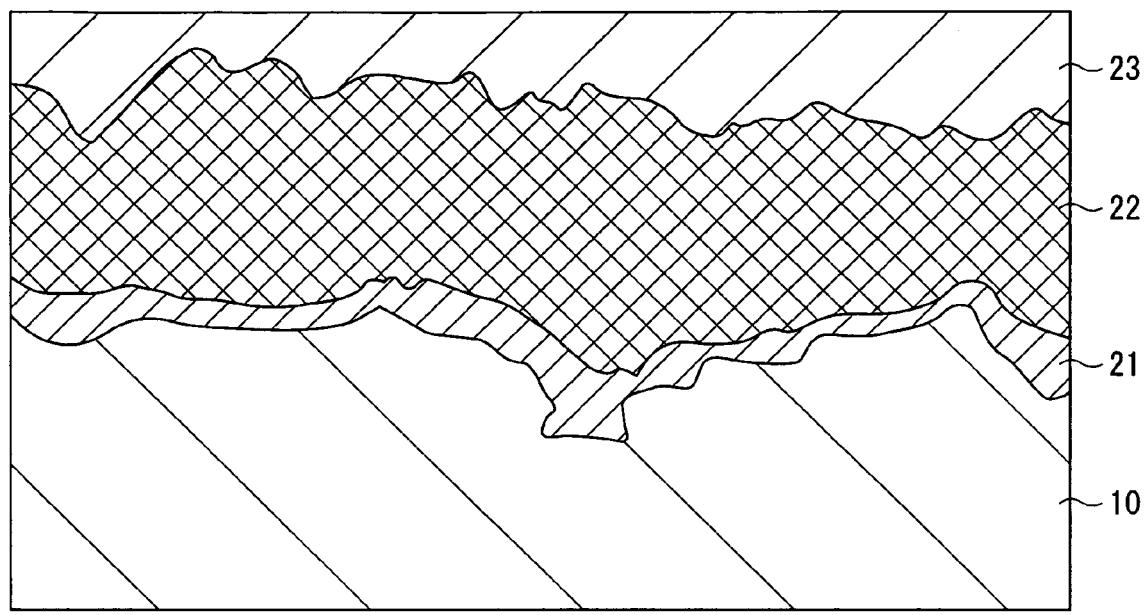
FIG. 3 is an explanatory diagram to illustrate a second protective film in the SIM photograph shown in FIG. 2.

On the other hand, the second protective film 22 is preferably in a columnar crystal state, for example. This is because high corrosion resistance is obtainable. The term "columnar crystal state" means the state in which crystals whose particle size in one direction is longer than the particle size in the vertical direction with respect to the one direction are arranged having a certain tendency, and they need not necessarily be arranged in the same direction. On the contrary, it is desirable that columnar crystals grow radially, as shown in FIG. 2. FIG. 2 is an SIM (scanning ion microscopy) image by the use of FIB (focused ion beam), in which the portion corresponding to the region indicated by crosshatching is the second protective film 22. In this structure, the crystal grain boundary is relatively complicated, making it possible to prevent erosion substance from the exterior from diffusing into the boundary. The dimension of the columnar crystal in the second protective film 22 is preferably 2 pm or more in the mean crystal grain size in the major axis direction, and 1 µm or less in the mean crystal grain size in the minor axis direction, especially 0.5 µm or less. In the case of such a columnar crystal state, the mean crystal grain size of the second protective-film 22 indicates the mean crystal grain size in the major axis direction.

In the protective film 20, the adjacent films (the first protective film 21 and the second protective film 22, or the second protective film 22 and the third protective film 23) have different crystal structures (crystal structures based on the difference in mean crystal grain size). Consequently, there is a tendency to facilitate to cancel pinholes in the step of forming (the step of plating) the protective film 20 than the case where the adjacent films have the same crystal structure. In other words, forming the protective film 20 as a multilayer film enables simple pinholes to be buried in the plating step (in process of growth of a plated film), so that pinholes are hard to remain in the protective film 20. However, since the sintered alloy of powder metallurgy as in the case of the magnet body 10 has a coarse grain size, a single plated film fails to cover the boundary portions of the magnet body 10 (fails to cover pinholes) in some cases. In this respect, if the adjacent films have different crystal structures, one film (a film formed on an underlying film) exhibits a film growth different from that of the other film (the underlying film), so that the boundary portions of the magnet body 10 can be covered (the pinholes can be filled) sufficiently with the plated film. Specifically, the columnar crystal state film (i.e. the second protective film 22) has electrodeposition growth so as not to cause spaces, and hence it is suitable for filling pinholes. From the viewpoint of this, the most preferable film structure of the protective film 20 is a laminate structure in which a film having a small mean crystal grain size and a film having a columnar crystal state are alternately laminated.

As to the material constituting the protective film 20, the first protective film 21, the second protective film 22 and the third protective film 23 are preferably nickel or nickel alloy, for example. This is because high corrosion resistance is obtainable. The above-mentioned material constituting the protective film 20 is not necessarily nickel or nickel alloy, and it may be copper, copper alloy, tin, or tin alloy, for example.

This rare earth magnet can be manufactured, for example, by forming the magnet body 10, and then forming the protective film 20 by laminating in sequence the first protective film 21, the second protective film 22 and the third protective film 23.

It is preferable to form the magnet body 10 by sintering method in the following manner. First, alloy of a desired composition is cast to prepare an ingot. Subsequently, the obtained ingot is roughly ground by a stamp mill or the like such that its grain size is approximately 10 µm to 800 µm, and further subjected to fine grinding by a ball mill or the like, resulting in powder having a grain size of approximately 0.5 µm to 5 µm. Subsequently, the obtained powder is formed preferably within a magnetic field. In this case, magnetic field intensity is preferably $10000\times10^3/(4\pi)$A/m(=10 kOe) or more, and molding pressure is preferably about 1 $Mg/cm^2$ to 5 $Mg/cm^2$.

Thereafter, the obtained molded body is sintered at 1000° C. to 1200° C. for 0.5 hours to 24 hours, followed by cooling.

Sintering atmosphere is preferably an atmosphere of an inert gas of argon (Ar) or the like, or vacuum. It is preferable to subsequently perform aging treatment in an atmosphere of an inert gas at 500° C. to 900° C. for one hour to five hours. This aging treatment may be performed a plurality of times.

When using two or more rare earth elements, a mixture such as misch metal may be used as a raw material. In an alternative, the magnet body 10 may be manufactured by a method other than sintering method, for example, by so-called quenching method employed in manufacturing a bulk body magnet.

The first protective film 21, the second protective film 22 and the third protective film 23 are preferably formed by electroplating. A plating bath is selected according to a plated film desired to form. In that time, the mean crystal grain sizes and the crystal shapes of the first protective film 21, the second protective film 22 and the third protective film 23 are controlled by adjusting the type of a plating bath or the current density during plating. For example, the first protective film 21 can be microcrystallized by applying overvoltage such that current density is from 0.3 A/dm$^2$ to 1 A/dm$^2$. The second protective film 22 can be made in a columnar crystal state, for example, by adjusting the current density so as to be from 0.01 A/dm$^2$ to 0.3 A/dm$^2$, and adding a suitable brightener. The third protective film 23 can be microcrystallized, for example, by adjusting the current density so as to be from 0.01 A/dm$^2$ to 0.3 A/dm$^2$, and adding a suitable brightener.

As the above-mentioned brightener for plating, for example, semi-gloss additive or gloss additive can be used. Examples of the semi-gloss additive are organic matters containing no sulfur, such as butynediol, coumalin, propargyl alcohol, or formalin. Examples of primary brighteners of gloss additive are saccharin, 1,5naphthalenedisulfonic acid sodium, 1,3,6-naphthalenetrisulfonic acid sodium, and para-toluene sulfonamide. Examples of secondary brighteners are coumaline, 2-butyne-1,4-diol, ethylene cyanohydrin, propargyl alcohol, formaldehyde, thiocarbamide, quinoline, and pyridine.

In an alternative, pretreatment may be performed before forming the protective film 20. Examples of pretreatments are degreasing with alkali or degreasing with organic solvent, and the subsequent activation by acid treatment or the like.

In this rare earth magnet, the first protective film 21, the second protective film 22 and the third protective film 23 are disposed by laminating them in sequence from the side of the magnet body 10. This improves the density of the interface between the magnet body 10 and the protective film 20, and the density of the surface of the protective film 20, thereby suppressing corrosion.

Thus, according to the embodiment, by the presence of the protective film 20 having the first protective film 21, the second protective film 22 and the third protective film 23, which are laminated in sequence from the side of the magnet body 10, the density of the protective film 20 can be improved, and the number of pinholes can be decreased, thereby improving corrosion resistance.

In particular, higher effect is obtainable by arranging such that the mean crystal grain size of the first protective film 21 is 0.5 μm or less, and the second protective film 22 is in a columnar crystal state.

EXAMPLES

Further, specific examples of the invention will be hereinafter described.

Example 1

A sintered body of Nd—Fe—B made by powder metallurgy was subjected to heat treatment at 600° C. in an atmosphere of argon for two hours, and then fabricated into a size of 56×40×8 (mm), and further chamfered by barrel polishing treatment, resulting in a magnet body 10. After the magnet body 10 was cleaned with alkaline degreasing liquid, surface activation was conducted with nitrate solution and then washed well with water.

Subsequently, on the surface of the magnet body 10, a first protective film 21 and a second protective film 22 each being composed of a nickel-plated film were formed in sequence by electroplating with the use of a Watts bath containing a semi-gloss additive. At that time, current density was adjusted so as to initially be over 0.7 A/dm$^2$ and thereafter to be 0.3 A/dm$^2$. Subsequently, a third protective film 23 composed of a nickel-plated film was formed by electroplating with the use of a Watts bath containing a gloss additive. At that time, current density was adjusted so as to be constant at 0.3 A/dm$^2$. This produced a rare earth magnet of Example 1.

Example 2

A rare earth magnet of Example 2 was obtained through the same procedure as in Example 1, except for the followings. That is, after a first protective film 21 composed of a nickel-sulfur alloy film was formed by electroplating with the use of a Watts bath containing an organic sulfur compound gloss additive (100 mgL (liter)), a second protective film 22 composed of a nickel-plated film was formed by electroplating with the use of a Watts bath containing a semi-gloss additive. Subsequently, a third protective film 23 composed of a nickel-plated film was formed by electroplating with the use of a Watts bath containing a gloss additive. At that time, the entire current density was adjusted so as to be constant at 0.3 A/dm$^2$.

Example 3

A rare earth magnet of Example 3 was obtained through the same procedure as in Example 1, except for the followings. That is, after a first protective film 21 was formed by electroplating with the use of a plating bath composed of nickel citrate (250 g/L) and boric acid (40 g/L), a second protective film 22 composed of a nickel-plated film was formed by electroplating with the use of a Watts bath containing a semi-gloss additive. Subsequently, a third protective film 23 composed of a nickel-plated film was formed by electroplating with the use of a Watts bath containing a gloss additive. At that time, the entire current density was adjusted so as to be constant at 0.3 A/dm$^2$.

Example 4

A rare earth magnet of Example 4 was obtained through the same procedure as in Example 1, except for the followings. That is, after a first protective film 21 composed of nickelphosphor alloy was formed by an electroless nickel plating bath of ammonia alkali type which was composed mainly of nickel citrate and hypophosphorous acid, a second protective film 22 composed of a nickel-plated film was formed by electroplating with the use of a Watts bath containing a semi-gloss additive. Subsequently, a third protective film 23 composed of a nickel-plated film was formed by electroplating with the use of a Watts bath containing a gloss additive. At that time, the entire current density was adjusted so as to be constant at 0.3 A/dm$^2$.

Comparative Example 1

A rare earth magnet was manufactured in the same manner as in Example 1, except that no first protective film was formed.

<Evaluations>

Figure 4:
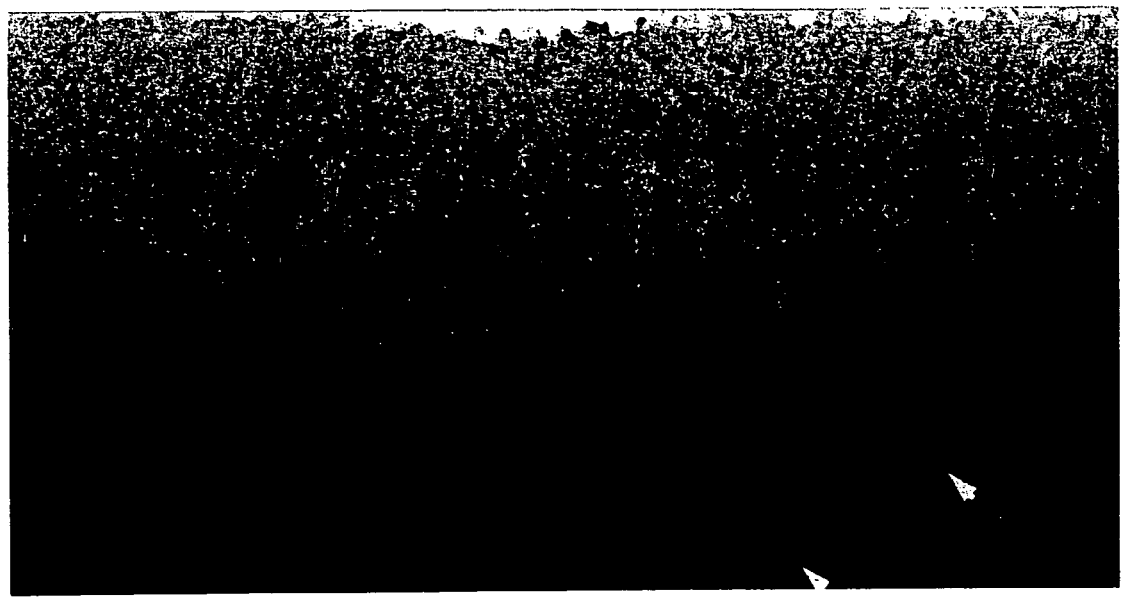
FIG. 4 is an SIM photograph showing a cross-sectional structure of a rare earth magnet according to Example 1.

With respect to the manufactured rare earth magnets of Examples 1 to 4, and Comparative Example 1, their respective cross sectional SIM images using the FIB were observed. FIG. 4 shows the SIM image of Example 1. As shown in FIG. 4, it can be seen that in the rare earth magnet of Example 1, the first protective film 21 in a microcrystal state, the second protective film 22 in a columnar crystal state, and the third protective film 23 in a microcrystal state are formed in sequence on the magnet body 10. The mean crystal grain size of the first protective film 21 was 0.5 μm or less, and its thickness was approximately 2 μm. The mean grain size in the major axis of the second protective film 22 was 5 μm to 10 μm, the mean grain size in the minor axis was 0.7 μm to 1 μm, and its thickness was approximately 5 μm. The mean crystal grain size of the third protective film 23 was 0.5 μm or less, and its thickness was approximately 5 μm.

Although Comparative Example 1 is not shown, a second protective film in a columnar crystal state and a third protective film in a microcrystal state were formed in sequence on the magnet body 10. The mean grain size in the major axis of the second protective film was 5 μm, the mean grain size in the minor axis was 1 μm, and its thickness was approximately 5 μm. The mean crystal grain size of the third protective film was 0.5 μm or less, and its thickness was approximately 5 μm.

The corrosion resistances of the rare earth magnets of Examples 1 to 4 and Comparative Example 1 were evaluated by conducting a humidified high-temperature test for 100 hours in a moisture atmosphere and at 120° C. and 0.2×10$^6$ Pa, and a salt spray test for 24 hours according to JIS-C-0023. Each appearance was checked with the naked eye, and the presence or absence of rust determined whether it passed or not. These results are shown in Table 1.

TABLE 1

| | Mean Crystal Grain Size | | | Humidified high temp. test | Salt spray test |
|---|---|---|---|---|---|
| | First protective film | Second protective film | Third protective film | | |
| Example 1 | 0.5 μm or less | 5 μm / 1 μm | 0.5 μm or less | Passed | Passed |
| Example 2 | 0.5 μm or less | 8 μm / 0.7 μm | 0.5 μm or less | Passed | Passed |
| Example 3 | 0.3 μm or less | 10 μm / 0.7 μm | 0.5 μm or less | Passed | Passed |
| Example 4 | 0.5 μm or less | 10 μm / 0.7 μm | 0.5 μm or less | Passed | Passed |
| Comparative Example 1 | — | 5 μm / 1 μm | 0.5 μm or less | Passed | Not-passed |

Note: In the columns of the mean crystal grain sizes of the second protective films, each upper stage corresponds to the value in the major axis direction, and each lower stage corresponds to the value in the minor axis direction.

As shown in Table 1, Examples 1 to 4 passed both of the humidified high-temperature test and the salt spray test, while in Comparative Example 1, corrosion observed in the salt spray test. That is, it was found that the presence of the first protective film 21 in a microcrystal state imparted excellent corrosion resistance.

Example 5

A rare earth magnet of Example 5 was obtained through the same procedure as in Example 1, except that the plating time was adjusted such that the mean grain size of a first protective film 21 was 0.5 μm or less, and its thickness was approximately 2 μm; and that the mean grain size in the major axis of a second protective film 22 was 1 μm, the mean grain size in the minor axis was 0.7 μm, and its thickness was approximately 2 μm; and that the mean grain size of a third protective film 23 was 0.5 μm or less, and its thickness was approximately 7 μm.

Example 6

A rare earth magnet of Example 6 was obtained through the same procedure as in Example 1, except that the plating time was adjusted such that the mean grain size of a first protective film 21 was 0.5 μm or less, and its thickness was approximately 2 μm; and that the mean grain size in the major axis of a second protective film 22 was 2 μm, the mean grain size in the minor axis was 0.8 μm, and its thickness was approximately 3 μm; and that the mean grain size of a third protective film 23 was 0.5 μm or less, and its thickness was approximately 7 μm.

Example 7

A rare earth magnet of Example 7 was obtained through the same procedure as in Example 1, except that the plating time was adjusted such that the mean grain size of a first protective film 21 was 0.5 μm or less, and its thickness was approximately 5 μm; and that the mean grain size in the major axis of a second protective film 22 was 60 μm, the mean grain size in the minor axis was 1.5 μm, and its thickness was approximately 75 μm; and that the mean grain size of a third protective film 23 was 0.5 μm or less, and its thickness was approximately 26 μm.

<Evaluation>

The corrosion resistances of the rare earth magnets of Examples 1 and 5 to 7 were evaluated by conducting the above-mentioned humidified high-temperature test and the above-mentioned salt spray test. These results are shown in Table 2.

TABLE 2

| | Mean Crystal Grain Size | | | Humidified high temp. test | Salt spray test |
|---|---|---|---|---|---|
| | First protective film | Second protective film | Third protective film | | |
| Example 1 | 0.5 μm or less | 5 μm<br>1 μm | 0.5 μm or less | Passed | Passed |
| Example 5 | 0.5 μm or less | 1 μm<br>0.7 μm | 0.5 μm or less | Passed | Passed (slight discoloration) |
| Example 6 | 0.5 μm or less | 2 μm<br>0.8 μm | 0.5 μm or less | Passed | Passed |
| Example 7 | 0.5 μm or less | 60 μm<br>1.5 μm | 0.5 μm or less | Passed | Passed |

Note: In the columns of the mean crystal grain sizes of the second protective films, each upper stage corresponds to the value in the major axis direction, and each lower stage corresponds to the value in the minor axis direction.

As shown in Table 2, except that a slight discoloration was observed in the salt spray test of Example 5, Examples 1 and 5 to 7 passed both of the humidified high-temperature test and the salt spray test. That is, it was found that excellent corrosion resistance were also obtainable.

Although there has been shown herein and described a certain preferred embodiment and examples of the invention, it is to be understood that it is not so limited but is susceptible of various changes and modifications. For example, the foregoing preferred embodiment and examples have discussed the case of having the magnet body 10 and the protective film 20, but any component other than these may be further disposed. For example, other film may be disposed between the magnet body 10 and the protective film 20, or on the protective film 20.

Although the foregoing preferred embodiment and examples have discussed the case where the protective film 20 has in sequence the first protective film 21, the second protective film 22 and the third protective film 23, it may further have any component other than these.

INDUSTRIAL APPLICABILITY

The rare earth magnet according to the present invention is suitably applicable to a motor for an electric vehicle, a motor for a hybrid vehicle, a motor for a robot, a motor for a hard disk voice coil, a motor for an optical pickup, a spindle motor, or the like.

The invention claimed is:

1. A rare earth magnet that has a magnet body containing a rare earth element and a protective film disposed on the magnet body, the protective film consisting of a three-layer structure comprising:

a first protective film that is in a microcrystalline state;

a second protective film that is in a columnar crystal state and has a larger mean crystal size than that of the first protective film; and a third protective film that is in a microcrystalline state and has a smaller mean crystal grain size than that of the second protective film;

wherein:

the first protective film, the second protective film and the third protective film are disposed sequentially from the side of the magnet body;

the first protective film as an undermost layer covers a surface of the magnet body and is covered by the second protective film;

the second protective film as an intermediate layer covers a surface of the first protective film and is covered by the third protective film;

the third protective film as an uppermost layer covers a surface of the second protective film and is exposed;

the first protective film and the third protective film have a mean crystal grain size of 0.5 μm or less; and the second protective film has a mean crystal grain size of 2 μm or more in the major axis direction and has a mean crystal grain size of 1 μm or less in the minor axis direction.

2. The rare earth magnet according to claim 1, wherein the second protective film is in a radially grown columnar crystal state.

3. The rare earth magnet according to claim 1, wherein the first, second and third protective films are composed of metal containing nickel or nickel alloy, respectively.

* * * * *